April 15, 1930. C. G. NELSON 1,754,759
SASH CONSTRUCTION
Filed Feb. 29, 1928
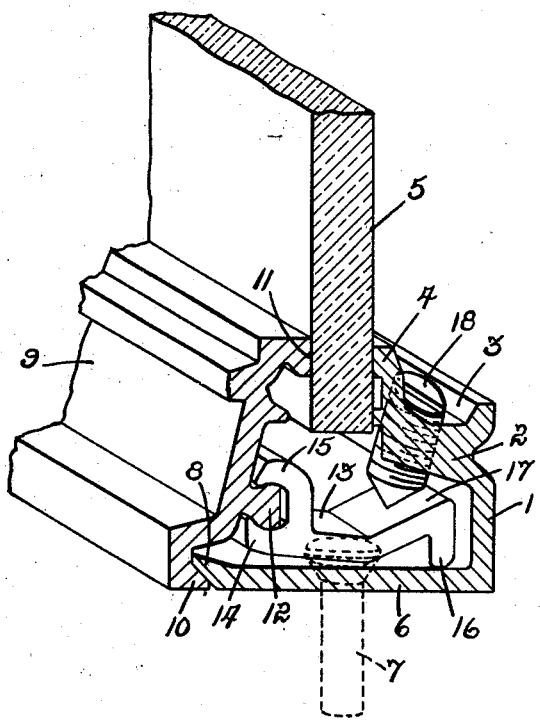
Inventor
Charles G. Nelson,
By Owen & Owen
Attorneys Patented Apr. 15, 1930

1,754,759

UNITED STATES PATENT OFFICE

CHARLES G. NELSON, OF CHICAGO HEIGHTS, ILLINOIS, ASSIGNOR TO ZOURI DRAWN METALS COMPANY, OF CHICAGO HEIGHTS, ILLINOIS, A CORPORATION OF ILLINOIS

SASH CONSTRUCTION

Application filed February 29, 1928. Serial No. 257,804.

This invention relates to sash construction especially adapted for use in store fronts and the like for setting plate glass. In its present embodiment, it is used in connection with key set extruded bronze clamping members.

The object of the invention is to provide a simple and improved construction, which may be easily secured, by means of a key, in position to clamp the glass, and which is particularly adapted to be adjusted to accommodate glass of any thickness.

The novel features of the invention and the advantages thereof will be more fully explained in connection with the accompanying drawing, in which the single figure is a perspective view illustrating the invention as used in clamping the glass.

In accordance with the invention, there is provided a channel-shaped clamping member 1 having an upper side wall 2, which may be formed on its upper face with a gutter 3, and which terminates in a broadened portion 4 having one or more faces against which the glass 5 rests. The lower side wall 6 of the channel member may be of any form suitable to rest upon or overlie a sill or other portion of a window frame, to which it may be secured by screws 7 or equivalent means, the heads of the screws being countersunk in the wall 6.

When the member 1 is in operative position the wall 6 extends across the plane of the glass 5 and its edge portion 8 is beveled on the underside, the upper surface of this edge portion being also inclined upwardly, if necessary, to obtain sufficient thickness. The front clamping member or face moulding 9 may be of any suitable design and is formed at its lower edge with a rearwardly extending flange 10, so shaped as to bear against the beveled underside of the edge portion 8 of the rear clamping member. The upper edge of the moulding 9 terminates in a face 11 adapted to bear against the front face of the glass 5.

The moulding 9 is formed on its rear face between the edges thereof with a bead 12, which is adapted to be engaged at various points along the length of the moulding by a draw plate 13 to hold the moulding in clamping relation to the glass. The upper and lower faces of the bead 12 are convex and form portions of a cylindrical surface, while the draw plate 13 is formed with opposed flanges 14 and 15 having concave cylindrical inner faces having the same radius as the faces of the bead 12 and adapted to turn thereon as the moulding 9 is adjusted toward or away from the glass. The inner edge of the flange 10 may also be slightly rounded and the line of contact between the flange 10 and the edge portion 8 of the rear clamping member constitutes the axis about which the moulding 9 turns as it is adjusted.

The rear end of the draw plate 13 is formed with a downturned flange 16, which rides upon the inner face of the wall 6 and supports the intermediate portion of the draw plate free of the rear clamping member. The portion of the draw plate 13 adjacent the flange 16 has an upwardly and rearwardly inclined surface 17 which is adapted to be engaged by the tapered end of a screw 18. This screw is mounted in a hole which is tapped through the wall 2 and may be adjusted by means of a suitable key to draw the plate 13 rearwardly and bring the surface 11 of the moulding 9 into clamping relation to the glass, whatever the thickness may be. The web which connects the bead 12 to the moulding 9 is thin enough to permit the slight rocking movement of the moulding with relation to the draw plate, which is necessary to effect the adjustment. The draw plates 13 are mounted upon the beads 12 before the moulding 9 is placed in position, by slipping them on over the end of the bead.

From the foregoing description it will be seen that I have provided a construction which is adapted to be used for setting plate glass of any thickness and which may be adjusted into clamping relation to the glass with the greatest facility by means of a key. It will be understood that the particular form of the invention herein shown and described is merely suggestive, and that the form and relative arrangement of the various elements may be considerably modified without any material departure from the scope of the invention as claimed.

What I claim is:

1. In a sash construction, a front clamping member and a rear clamping member having coengaging edges, the line of engagement constituting an axis about which one of said members is relatively adjustable to clamp the glass, a draw plate, and means acting upon the draw plate to effect the clamping action, said draw plate and one of the clamping members having coengaging portions, one of said portions forming flanges curved toward each other and having opposed coaxial cylindrical faces of equal radii and the other of said portions forming a bead with convex faces fitting within said cylindrical faces to constitute a hinge connection.

2. In a sash construction, a front clamping member, a rear clamping member, a fixed abutment against which one edge of one of said clamping members engages, the line of engagement thereof constituting an axis about which it is relatively adjustable to clamp the glass, a draw plate having a hinge connection with the adjustable member, and means acting upon the draw plate to cause said members to clamp the glass between them.

3. In a sash construction, a front clamping member, a rear clamping member, a fixed abutment against which one edge of one of said clamping members engages, the line of engagement thereof constituting an axis about which it is relatively adjustable to clamp the glass, a draw plate, and means acting upon the draw plate to effect the clamping action, said draw plate and one of the clamping members having coengaging portions, one of which forms flanges curved toward each other and having opposed coaxial cylindrical faces of equal radii and the other of which forms a bead with convex faces fitting within said cylindrical faces to constitute a hinge connection.

4. In a sash construction, the combination of two clamping members having opposed glass engaging portions, one of said members having a bead extending from the face which is toward the other member, said bead being formed with oppositely disposed faces cylindrical in form and having a common axis, a draw plate having flanges with opposed faces fitting the faces of the bead so as to pivot thereon, and means acting upon the draw plate to cause said members to clamp the glass between them.

5. In a sash construction, a front clamping member, a rear clamping member, a fixed abutment against which one edge of one of said clamping members engages, the line of engagement thereof constituting an axis about which it is relatively adjustable to clamp the glass, one of said members having a bead extending from the face which is toward the other member, said bead being formed with oppositely disposed faces cylindrical in form and having a common axis, a draw plate having flanges with opposed faces fitting the faces of the bead so as to pivot thereon, and means acting upon the draw plate to cause said members to clamp the glass between them.

6. In a sash construction, a front clamping member and a rear clamping member having coengaging edges, the line of engagement constituting an axis about which one of said members is relatively adjustable to clamp the glass, one of said members having a bead on the face which is toward the other member, said bead being formed with oppositely disposed faces cylindrical in form and having a common axis, a draw plate having flanges with opposed faces fitting the faces of the bead so as to pivot thereon, and means acting upon the draw plate to cause said members to clamp the glass between them.

7. In a sash construction, a front clamping member and a rear clamping member having co-engaging edges, the line of engagement constituting an axis about which one of said members is relatively adjustable to clamp the glass, the other of said members being fixed, a draw plate having a hinge connection with the adjustable member and extending across the plane of the glass, and means on the side of the glass opposite said hinge connection acting upon the draw plate to cause the latter, through the medium of the hinge connection, to draw the clamping edge of the adjustable member toward the fixed member, to cause said members to clamp the glass regardless of the thickness of the glass.

In testimony whereof, I have hereunto signed my name to this specification.

CHARLES G. NELSON.